(12) United States Patent
Tripp et al.

(10) Patent No.: US 12,070,103 B2
(45) Date of Patent: Aug. 27, 2024

(54) ATTACHING AND/OR RELEASING PARTS USING LOBE-AND-TROUGH ENGAGEMENT

(71) Applicant: Howe & Howe Inc., Waterboro, ME (US)

(72) Inventors: Forrest Joel Tripp, East Waterboro, ME (US); Anthony Victor Castro, Cape Elizabeth, ME (US)

(73) Assignee: Howe & Howe Inc., Waterboro, ME (US)

( * ) Notice: Subject to any disclaimer, the term of this patent is extended or adjusted under 35 U.S.C. 154(b) by 0 days.

(21) Appl. No.: 18/479,513

(22) Filed: Oct. 2, 2023

(65) Prior Publication Data

US 2024/0108104 A1    Apr. 4, 2024

Related U.S. Application Data

(60) Provisional application No. 63/411,956, filed on Sep. 30, 2022.

(51) Int. Cl.
| | | |
|---|---|---|
| *A44B 19/14* | (2006.01) | |
| *F16B 2/22* | (2006.01) | |
| *F16B 5/07* | (2006.01) | |

(52) U.S. Cl.
CPC .................................. *A44B 19/14* (2013.01)

(58) Field of Classification Search
CPC ............... A44B 19/14; F16B 2/22; F16B 5/07
See application file for complete search history.

(56) References Cited

U.S. PATENT DOCUMENTS

| | | | |
|---|---|---|---|
| 3,101,517 A | | 8/1963 | Marvin et al. |
| 3,373,464 A | * | 3/1968 | Ausnit ...................... E04H 4/10 |
| | | | 24/399 |
| 3,440,696 A | * | 4/1969 | Staller ..................... B29C 65/58 |
| | | | 24/DIG. 39 |
| 5,611,122 A | | 3/1997 | Torigoe et al. |
| 5,983,467 A | | 11/1999 | Duffy |
| 6,026,761 A | * | 2/2000 | Parniske .................. B63B 17/02 |
| | | | 114/361 |
| 7,036,190 B2 | | 5/2006 | Demarest |
| 10,342,300 B2 | | 7/2019 | Bronson |
| 10,932,531 B2 | | 3/2021 | Morar |
| 11,129,450 B1 | | 9/2021 | Mancini et al. |
| 2013/0091667 A1 | * | 4/2013 | Zerfas ................ B65D 33/2541 |
| | | | 427/508 |

(Continued)

FOREIGN PATENT DOCUMENTS

| | | | |
|---|---|---|---|
| DE | 3113020 | 11/1982 | |
| DE | 3113020 A1 | * 11/1982 | ......... A44B 18/0053 |

(Continued)

OTHER PUBLICATIONS

International Search Report and Written Opinion for application No. PCT/2023/034296, dated Jan. 26, 2024, 12 pages.

*Primary Examiner* — Bayan Salone
(74) *Attorney, Agent, or Firm* — BainwoodHuang

(57) ABSTRACT

A technique for forming a releasable attachment provides first and second latch strips each having an alternating pattern of lobes and troughs. The lobes of the first latch strip are adapted to fit within the troughs of the second latch strip, and vice versa, with the lobes retained within the troughs until sufficient force is applied between the first and second latch strips to separate them.

16 Claims, 7 Drawing Sheets

(56) References Cited

U.S. PATENT DOCUMENTS

2014/0250641 A1* 9/2014 Zerfas ................ B65D 33/2541
  24/449
2021/0267321 A1  9/2021 Duffy

FOREIGN PATENT DOCUMENTS

WO     2017197479    11/2017
WO   WO-2017197479 A1 * 11/2017 ......... A44B 18/0053

* cited by examiner

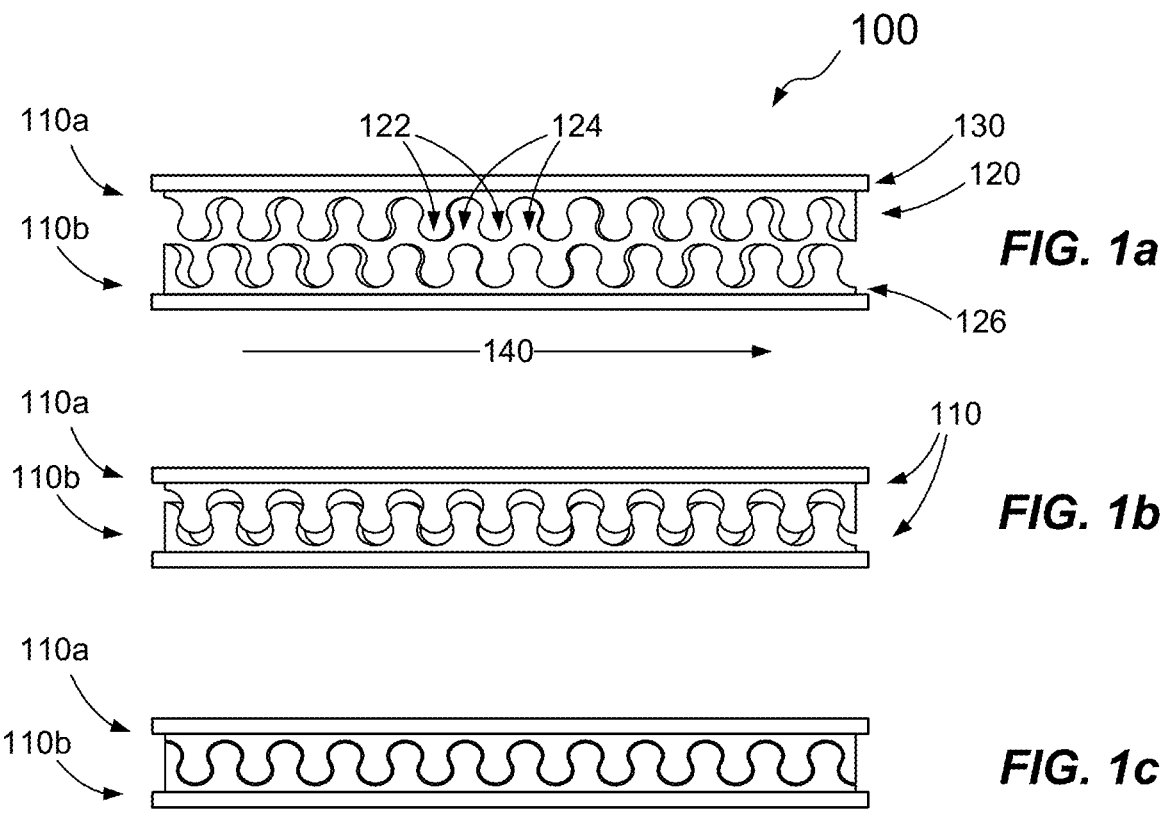
FIG. 1a
FIG. 1b
FIG. 1c
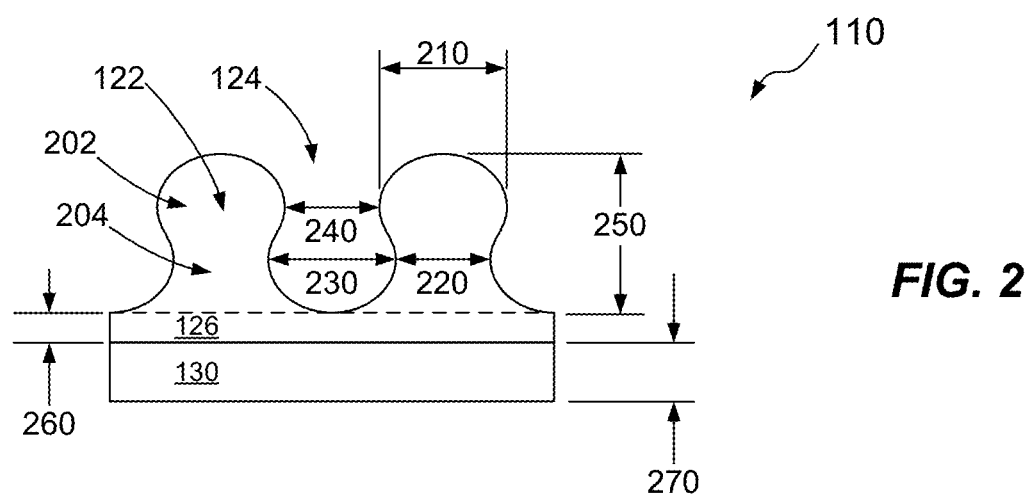
FIG. 2

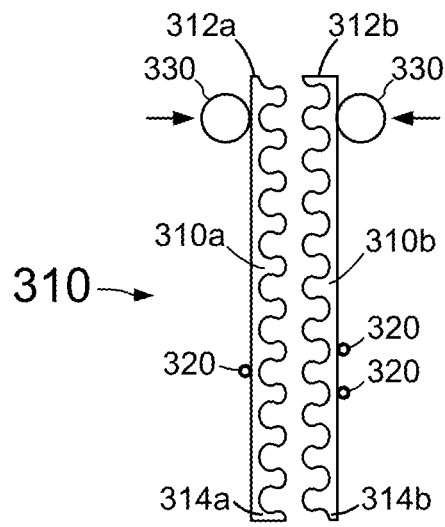
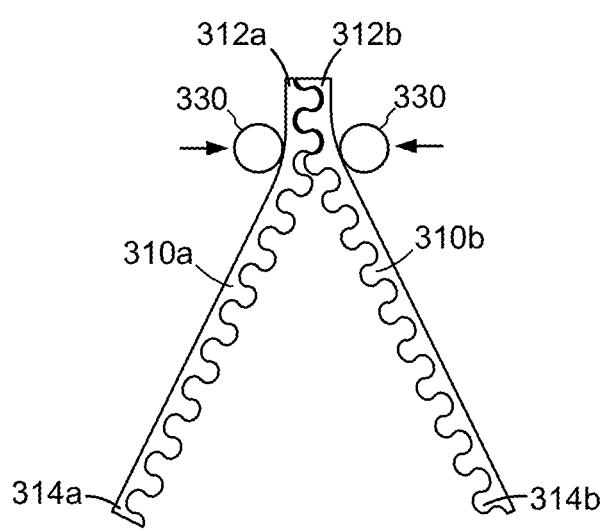
FIG. 3a  FIG. 3b
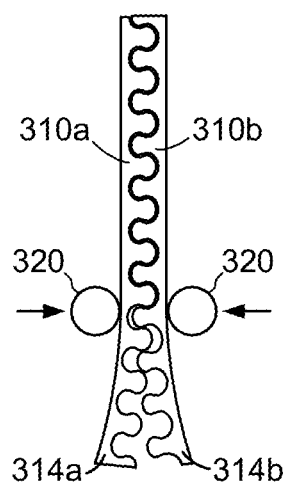
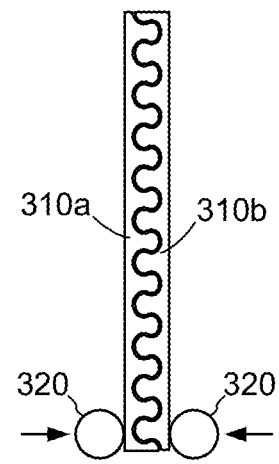
FIG. 3c  FIG. 3d

ATTACHING AND/OR RELEASING PARTS USING LOBE-AND-TROUGH ENGAGEMENT

CROSS-REFERENCE TO RELATED APPLICATIONS

This application claims the benefit of prior-filed U.S. Provisional Application No. 63/411,956, filed Sep. 30, 2022, the contents and teachings of which are incorporated herein by reference in their entirety.

BACKGROUND

Attaching parts together in a releasable manner is a longstanding challenge for which many solutions have been proposed. Examples of such solutions include screws, buttons, hook-and-loop fasteners, and the like.

SUMMARY

Unfortunately, conventional solutions for providing releasable attachments are not always optimal. Screws and buttons require dexterity and/or space in which to maneuver and thus are poorly suited for blind-mate attachments. They can also be slow to apply and release. Hook-and-loop fasteners, such as VELCRO®, can be used in blind-mate situations but are sensitive to harsh environments. For instance, hook-and-loop fasteners work well in clean environments but can degrade in smokey or debris-filled environments, where loops can become blocked, and in very hot environments, where hooks can become weakened, causing them to lose their grip. Thus, there is a need for a releasable attachment scheme that is fast and convenient to apply and release, even in blind-mate situations, and is tolerant to extreme environments.

To address the above need at least in part, an improved technique for forming a releasable attachment provides first and second latch strips each having an alternating pattern of lobes and troughs. The lobes of the first latch strip are adapted to fit within the troughs of the second latch strip, and vice-versa, with the lobes retained within the troughs until sufficient force is applied between the first and second latch strips to separate them.

Certain embodiments are directed to a fastener for forming a releasable attachment. The fastener includes a first latch strip composed at least in part of deformable material and having a first plurality of lobes and a first plurality of troughs. The fastener further includes a second latch strip having a second plurality of lobes and a second plurality of troughs. At least some of the first plurality of lobes are disposed within at least some of the second plurality of troughs and at least some of the second plurality of lobes are disposed within at least some of the first plurality of troughs.

In some examples, the deformable material has a hardness in a range between 20 A and 90 A Durometer.

In some examples, each of the lobes of the first plurality of lobes and the second plurality of lobes has a head portion and a neck portion narrower than the head portion, and each of the troughs of the first plurality of troughs and the second plurality of troughs has a wider region arranged to receive a head portion and a narrower region arranged to receive a neck portion.

In some examples, the wider regions of the troughs are wider than the head portions of the lobes.

In some examples, the head portions of the lobes have a width in a range between 0.5 cm and 10 cm.

In some examples, at least one of the first latch strip and the second latch strip has a rigid base that resists deformation in a lengthwise dimension.

In some examples, at least one of the first latch strip and the second latch strip is flexible in a lengthwise dimension and deforms in response to manually applied forces.

In some examples, the first latch strip and the second latch strip are both flexible in the lengthwise dimension, and the first latch strip and the second latch strip can be separated by bending, along the lengthwise dimension, an end of the first latch strip away from an adjacent end of the second latch strip.

In some examples, at least one of the first latch strip and the second latch strip includes an anchoring feature for affixing the respective latch strip(s) to one or more flexible materials.

In some examples, the lobes have substantially rounded tops and the troughs have substantially rounded bottoms.

In some examples, the lobes have substantially flat tops and the troughs have substantially flat bottoms.

In some examples, the fastener further includes a ladder piece having an alternating arrangement of slots and rungs, the lobes of the first plurality of lobes extending through the slots, and the bottoms of the troughs of the first plurality of troughs abutting the rungs.

In some examples, the fastener further includes comprising a spacer piece having an outer frame disposed against the ladder piece and an inner opening into or through which a back of the first latch strip extends.

In some examples, the fastener further includes: a first ladder piece having an alternating arrangement of slots and rungs, the lobes of the first plurality of lobes extending through the slots, the bottoms of the troughs of the first plurality troughs abutting the rungs; a first spacer piece having an outer frame disposed against the first ladder piece and an inner opening into or through which a back of the first latch strip extends; a second ladder piece having an alternating arrangement of slots and rungs, the lobes of the second plurality of lobes extending through the slots of the second ladder piece, the bottoms of the troughs of the second plurality troughs abutting the rungs of the second ladder piece; and a second spacer piece having an outer frame disposed against the second ladder piece and an inner opening into or through which a back of the second latch strip extends.

In some examples, the rungs of the first ladder piece are disposed between the back of the first latch strip and the second plurality of lobes, and the rungs of the second ladder piece are disposed between the back of the second latch strip and the first plurality of lobes.

Other embodiments are directed to a vehicle that includes a surface, an accessory, and a fastener that forms a releasable attachment between the surface and the accessory. The fastener includes a first latch strip composed at least in part of deformable material and having a first plurality of lobes and a first plurality of troughs, and a second latch strip having a second plurality of lobes and a second plurality of troughs. At least some of the first plurality of lobes are disposed within at least some of the second plurality of troughs and at least some of the second plurality of lobes are disposed within at least some of the first plurality of troughs.

Still further embodiments are directed to a method of handling a releasable attachment between a first surface and a second surface. The method includes securing a first latch strip to the first surface, the first latch strip including a first plurality of lobes, securing a second latch strip to the second surface, the second latch strip including a second plurality of lobes, and attaching the first surface to the second surface by forming an interlocking engagement between at least some of the first plurality of lobes and at least some of the second plurality of lobes.

In some examples, the method further includes separating the first surface from the second surface by pulling apart the first latch strip and the second latch strip.

In some examples, attaching the first surface to the second surface includes pinching together, between first and second members, the first latch strip and the second latch strip at respective first ends thereof, and while continuing to pinch together the first latch strip and the second latch strip, sliding the first and second members toward respective second ends of the first latch strip and the second latch strip to progressively form the interlocking engagement between the first plurality of lobes and the second plurality of lobes.

In some examples, the method further includes separating the first latch strip from the second latch strip at least in part by bending the first latch strip away from the second latch strip at adjacent ends thereof and pulling apart the first latch strip from the second latch strip such that the lobes of the first plurality of lobes become progressively separated from the lobes of the second plurality of lobes and are no longer interlocking.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIGS. 1a-1c are front views of a pair of latch strips according to a first embodiment.

FIG. 2 is a magnified front view of a latch strip of FIGS. 1a-1c.

FIGS. 3a-3d are front views of a pair of latch strips according to a second embodiment.

DETAILED DESCRIPTION

Figure 4A:
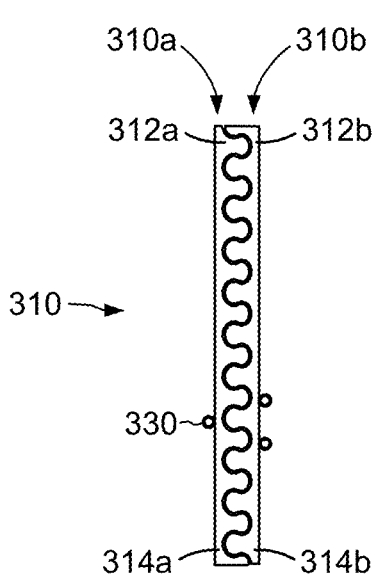
FIGS. 4a-4d are additional front views of a pair of latch strips according to the second embodiment.
Figure 4B:
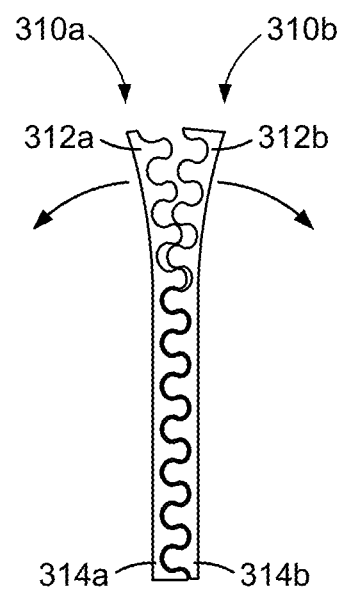
Figure 4C:
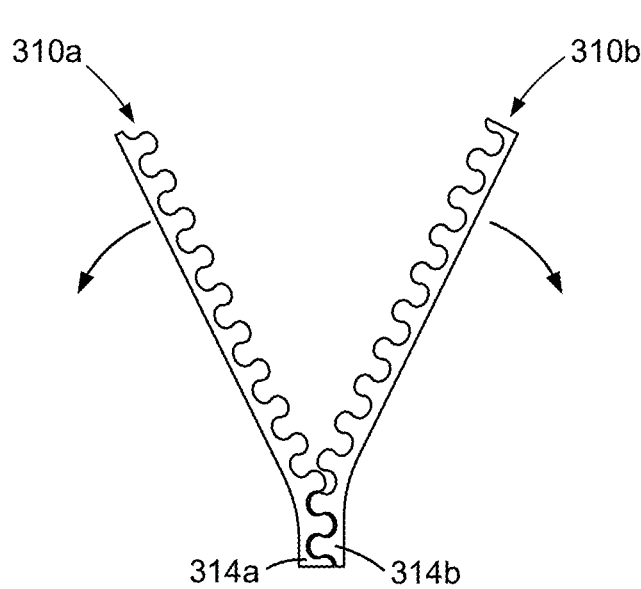

Embodiments of the improved technique will now be described. One should appreciate that such embodiments are provided by way of example to illustrate certain features and principles but are not intended to be limiting.

An improved technique for forming a releasable attachment provides first and second latch strips each having an alternating pattern of lobes and troughs. The lobes of the first latch strip are adapted to fit within the troughs of the second latch strip, and vice-versa, with the lobes retained within the troughs until sufficient force is applied between the first and second latch strips to separate them.

FIGS. 1a through 1c show an example fastener 100 in accordance with a first embodiment. The fastener 100 includes a first latch strip 110a and a second latch strip 110b. Each latch strip 110 includes a main body 120 that includes a bottom region 126 and an alternating pattern of lobes 122 and troughs 124. The lobes 122 of each latch strip 110 are constructed and arranged to fit within the troughs 124 of the other latch strip. In this embodiment, the lobes 122 have rounded tops and the troughs 124 have rounded bottoms. Also, each latch strip 110 has a rigid base 130 which resists lengthwise deformation along a length dimension 140.

As shown in the sequence of FIGS. 1a through 1c, the two latch strips 110a and 110b may be pressed together to form an interlocking connection of the lobes 122 of one latch strip with the troughs 124 of the other. At least one of the latch strips 110a and 110b is composed of a deformable, compressible material. For example, when pressing the latch strips 110 together, the lobes 122 of one or both of the latch strips 110 compress widthwise as they slide past each other, and then expand back to their original shape once the latch strips 110 are fully engaged.

FIG. 2 shows a portion of an example latch strip 110 in greater detail. Here, the lobes 122 include a head portion 202 and a neck portion 204. The head portion 202 has a width 210, and the neck portion 204 has a width 220, which is narrower than the width 210 of the head portion 202. Likewise, the troughs 124 include a wider region having a width 230 and a narrower region having a width 240. When the first and second latch strips are engaged, the head portions 202 of the lobes 122 of each latch strip 110 snap or otherwise move past the head portions 202 of the lobes 122 of the other latch strip and rest against adjacent neck portions 204 of the lobes 122 of the other latch strip 110b. The narrower neck portions 204 retain the wider head portions 202, resisting separation of the two latch strips.

In some examples, the lobes 122 and troughs 124 have identical sizes and shapes, such that the lobes 122 fit precisely and completely within the opposing troughs 124. In other examples, the troughs 124 are larger than the lobes 122, and a degree of play is permitted in the engagement of lobes with troughs. Where watertight attachments are desired, any play between lobes and troughs is minimized or eliminated.

For at least one of the latch strips 110, the main body 120, including the lobes 122, is made of a compressible material, such as rubber, plastic, or the like, which is preferably stiff enough to provide the desired holding force, while also being compliant enough to deform when sufficient force is supplied. It has been found that 50 A Durometer hardness is a good choice for many applications, with a range between 20 A and 90 A Durometer being suitable for most uses. These are merely examples, however. Also, the Durometer of the first latch strip 110a may be greater than the Durometer of the second latch strip 110b, or vice versa. In some examples, one of the latch strips 110 is made of a deformable, compressible material, but the other is made of a substantially non-deformable, non-compressible material, such as hard plastic, steel, or some other hard material. In some examples, the compressible material is rated for high temperature, such that the latch strips 110 retain their strength and function, even in exceedingly hot environments (e.g., firefighting scenarios). In some examples, the lobes 122 are on the order of a centimeter at their widest points (e.g., in a range between 0.5 cm and 10 cm), and thus are too large to be hindered by dust or debris.

In some examples, the rigid base 130 is integral with the main body 120, e.g., by blending a harder material with the main body 120 during molding. Alternatively, the rigid base 130 may be a separate piece that is attached or affixed, e.g., by gluing, bonding, screwing, riveting, or the like. The rigid base 130 keeps the latch strips 110 substantially flat and straight. In an example, the rigid base 130 provides a site for attaching a latch strip 110 to an external surface, such as a panel, bracket, assembly, or the like. For example, the rigid base 130 may be screwed, glued, riveted, or otherwise affixed to the external surface. The bottoms of the troughs 124 provide good locations for receiving the heads of screws, rivets, or the like, which may extend through the rigid base 130 and into the external surface. Where troughs 124 are used for this purpose, the bottoms of the troughs 124 may have a countersunk or depressed region for receiving the head of a fastener, without disturbing the engagement of the lobes 122 into the troughs 124. In some examples, the rigid base 130 may be omitted, and the main bodies 120 of the latch strips 110 may be affixed directly to the respective surfaces to be joined.

In cases in which the latch strips 110 have rigid bases 130 or are affixed to flat, rigid surfaces, a force required to separate the latch strips 110 from each other is based at least in part on the hardness of the materials and the difference between the width 210 of the heads 202 at their widest points and the width 240 of the troughs 124 at their narrowest points. A smaller difference enables the latch strips 110 to be separated by a human operator pulling them straight apart, whereas a larger difference may require tools (e.g., a pry bar). In some examples, with a hardness of the main bodies 120 of both latch strips 110 in the range of 20 A to 90 A Durometer, making the width 210 5-10% larger than the width 240 provides good performance.

FIGS. 3a through 3d show a second embodiment in which latch strips 310 do not have rigid bases 130 but rather are allowed to flex along their lengths. Such latch strips 310 may be used to fasten together flexible materials, such as tarps, sails, and the like, and may include anchoring features 320, such as eyelets or grommets, for example, which allow the latch strips 310 to be sewn, strung, or otherwise fastened to the flexible materials. The anchoring features 320 may be integral with the latch strips 310 or attached. Once again, bottoms of troughs 124 may provide good attachment points for fasteners.

When using flexible latch strips 310, the difference in widths 210 and 240 (FIG. 2) may be in the range of 10-25%. A difference this large makes it difficult to push together or pull apart the latch strips 310 using perpendicularly applied forces. Owing to their flexibility, however, the latch strips 310 may still be connected and disconnected by applying force to small regions of the latch strips 310 and/or by bending them in a way that temporarily enlarges the widths of the troughs 124.

As shown in FIG. 3a, a pair of opposing members 330 may be used to pinch together proximal ends 312a and 312b of two latch strips 310a and 310b, respectively. The members 330 may be two fingers of a human operator or two arms of a tool, such as a wrench, for example. As shown in FIG. 3b, pinching together the ends 312a and 312b forms an initial point of engagement between the latch strips 310a and 310b. In FIGS. 3c and 3d, the members 320 may be advanced down the length of the latch strips 310, until they reach distal ends 314a and 314b, at which point the latch strips 310a and 310b are fully connected along their lengths.

FIGS. 4a through 4d show an example sequence of separating latch strips 310 according to the second embodiment. Here, the latch strips 310 may be pulled apart from their respective ends. For example, bending apart the ends 312a and 312b of an engaged pair of latch strips 310a and 310b opens the troughs 124 at those ends and allows the lobes 122 of opposing latch strips to be withdrawn easily. The effect propagates down the length of the latch strips 310 as the latch strips continue to be pulled apart, until the two latch strips are completely separated. In the manner described, the flexible latch strips 310 can be separated and joined together much like a zipper is opened and closed.

In some examples, the flexibility of the latch strips 310 along their lengths may be varied by varying the thickness of a bottom region 126 of the latch strips 310, i.e., the region between the bottoms of the troughs 124 and the bottoms of the main bodies 120. Making this region thinner increases flexibility, while making it thicker decreases flexibility. Optimal thickness may vary depending on intended use.

Figure 5:
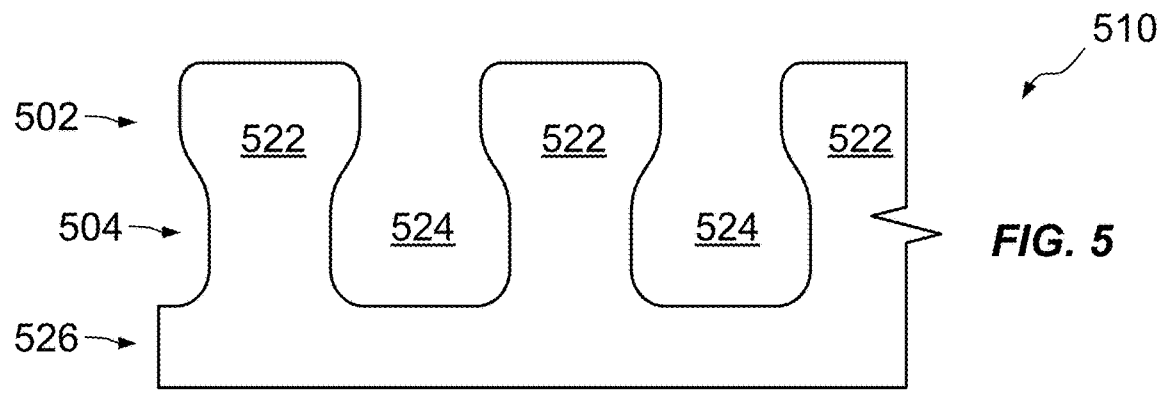
FIG. 5 is a front view of an example latch strip according to a third embodiment.

FIG. 5 shows an example latch strip 510 according to a third embodiment. Here, the latch strip 510 has lobes 522 with flat tops and troughs 524 with flat bottoms. The lobes 522 have heads 502 and necks 504. The latch strip 510 also has a bottom region 526.

Figure 6:
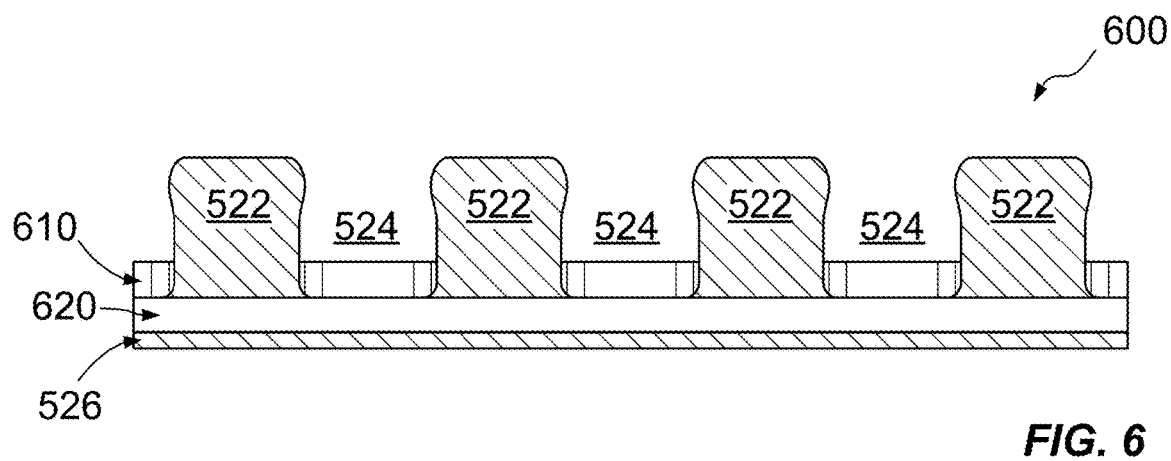
FIG. 6 is a front view of a latch-strip assembly.
Figure 7:
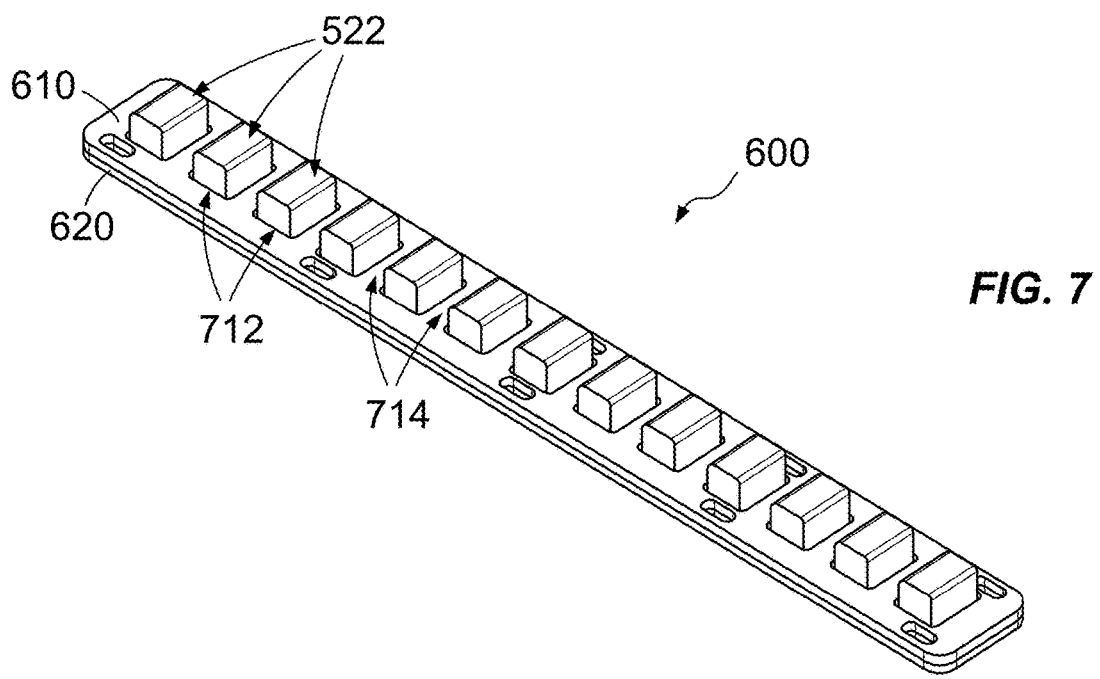
FIG. 7 is a top isometric view of the latch strip assembly of FIG. 6.

As shown in FIGS. 6 and 7, the latch strip 510 may be part of a latch-strip assembly 600. The assembly 600 includes a latch strip 510, a ladder piece 610, and a spacer piece 620. The ladder piece 610 has a series of slots 712, through which lobes 522 of a latch strip 510 extend, and a series of rungs 714, which sit at the bottoms of the troughs 524. The bottoms of the troughs 524 and the bottom region 526 of the latch strip 510 remain below the ladder piece 710. The spacer piece 620 is disposed below the ladder piece 610, i.e., between the ladder piece 610 and an external surface on which the latch-strip assembly 600 is to be mounted.

Figure 8:
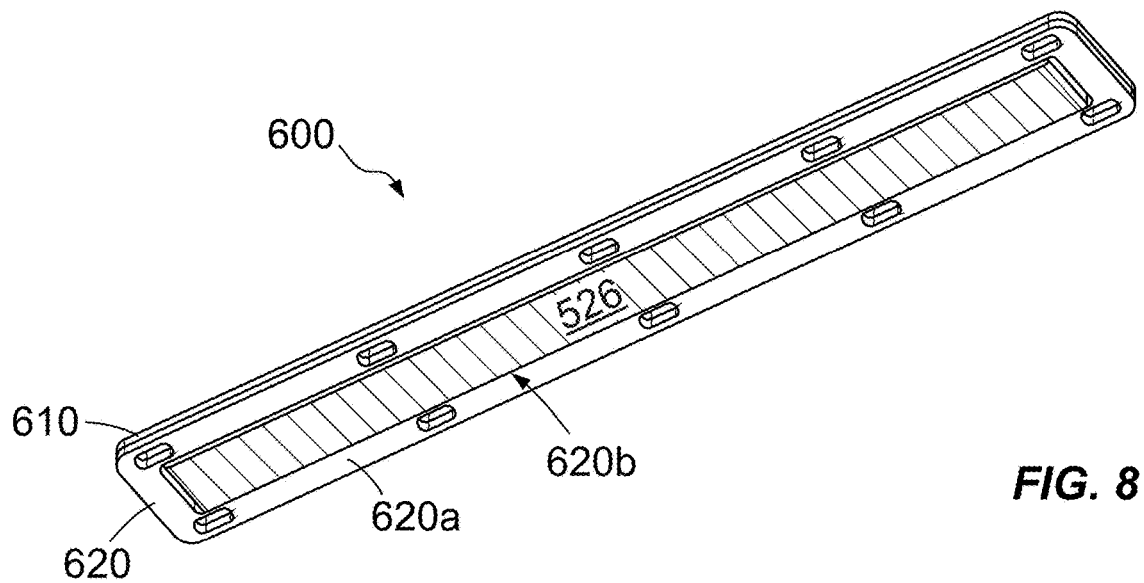
FIG. 8 is a bottom, isometric view of the latch strip assembly of FIG. 6.

As shown in FIG. 8, the spacer piece 620 includes a frame 620a and an open region 620b, which at least partially contains the bottom region 526 of the latch strip 510. When the latch strip 510 is composed of a compressible material, the spacer piece 620 avoids overly compressing the bottom region 526 of the latch strip 510 when attaching the assembly 600 to the external surface. In some examples, the bottom region 526 of the latch strip 510 extends a small distance below the spacer piece 520 (from the perspective of FIG. 8), for providing a tight engagement with the external surface when attached. Attachment to the external surface may be achieved in any suitable manner, e.g., screws, nuts, bolts, rivets, etc.

Figure 9A:
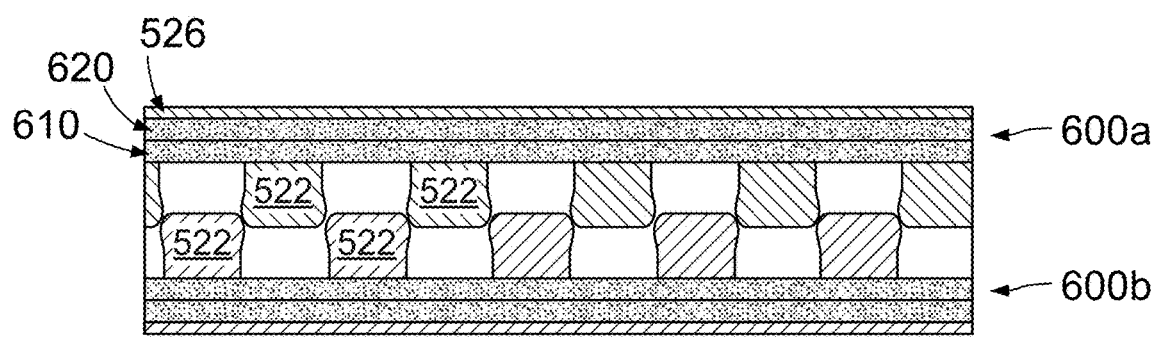
FIGS. 9a and 9b are front views of a pair of latch-strip assemblies, shown as disengaged (FIG. 9a) and fully engaged (FIG. 9b).
Figure 9B:
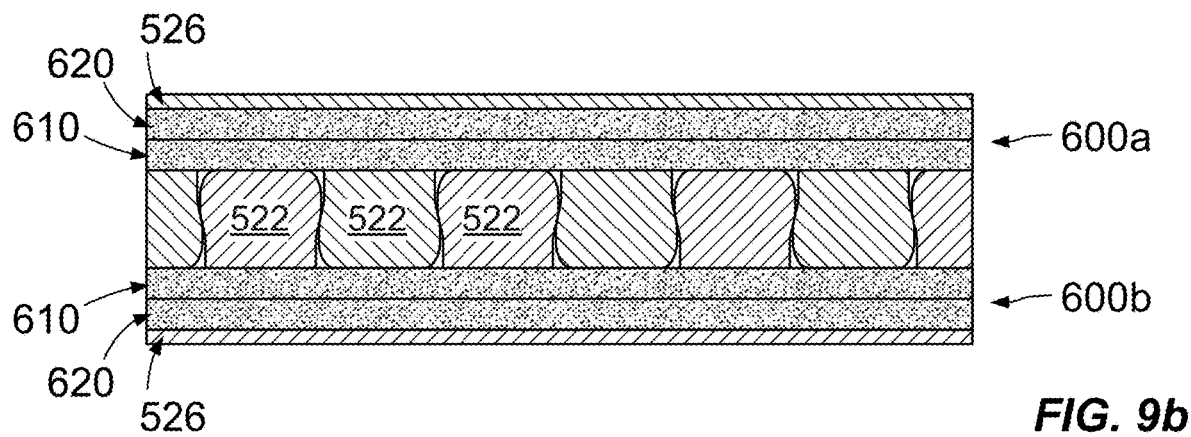

FIGS. 9a and 9b show an example arrangement for engaging two latch-strip assemblies 600a and 600b. The assemblies 600a and 600b may be aligned and pressed together as shown. In an example, the lobes 522 and troughs 524 of two latch-strip assemblies are sized to engage tightly with each other, while leaving space for rungs 714 of the ladder pieces 610, which hold down the troughs 524 of each latch strip 510 while abutting the lobes 522 of the opposing assembly. As before, at least one of the latch strips 510 is composed of a deformable, compressible material.

Figure 10:
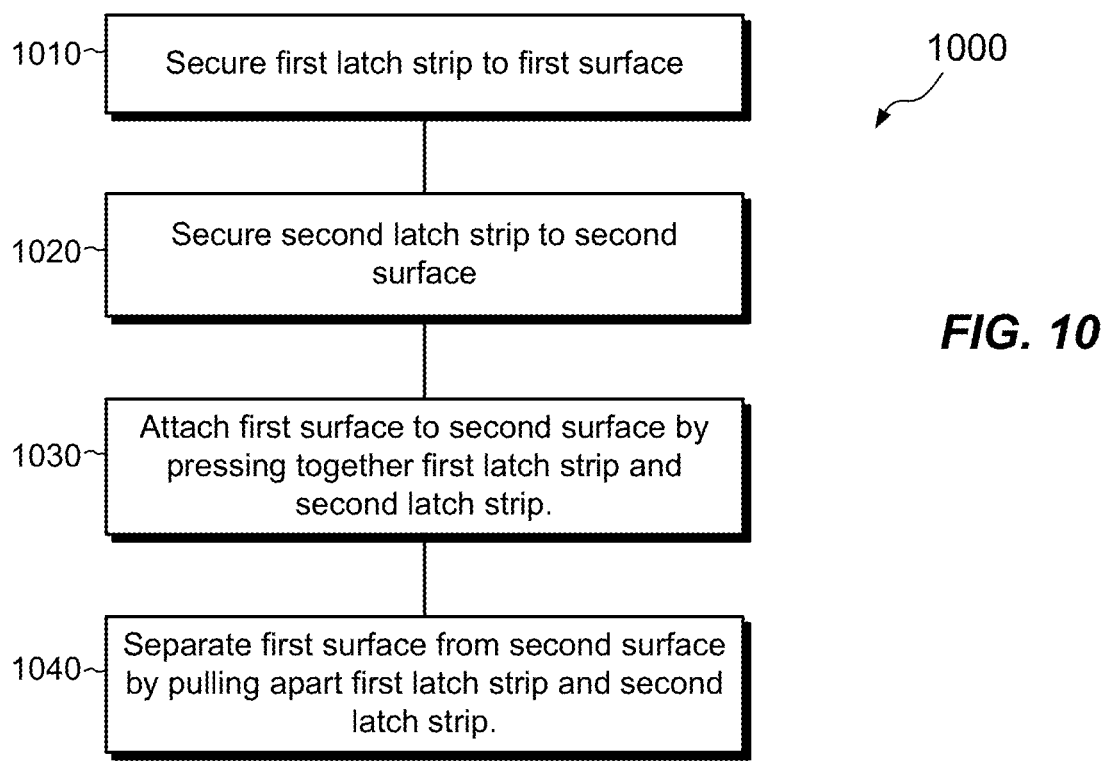
FIG. 10 is a flowchart showing an example method of engaging and disengaging first and second latch strips according to the first and third embodiments.

FIG. 10 shows an example method 1000 of joining and separating latch strips 110 and 510 according to the first and third embodiments. At 1010, a first latch strip (110 or 510) is secured to a first surface. At 1020, a second latch strip (110 or 510) is secured to a second surface. At 1030, the first surface is attached to the second surface by pressing together the first latch strip and the second latch strip. At 1040, which typically occurs at a later time, the two latch strips can be separated simply by pulling them apart, e.g., by hand or by using tools, such as a pry bar.

Figure 4D:
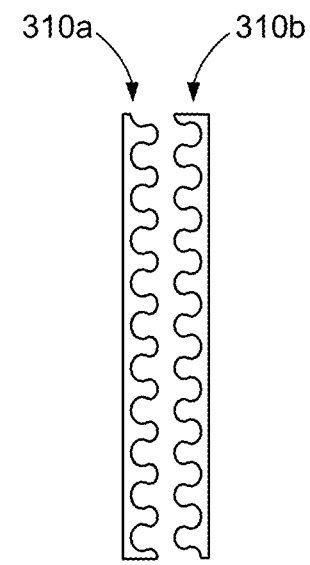
Figure 11:
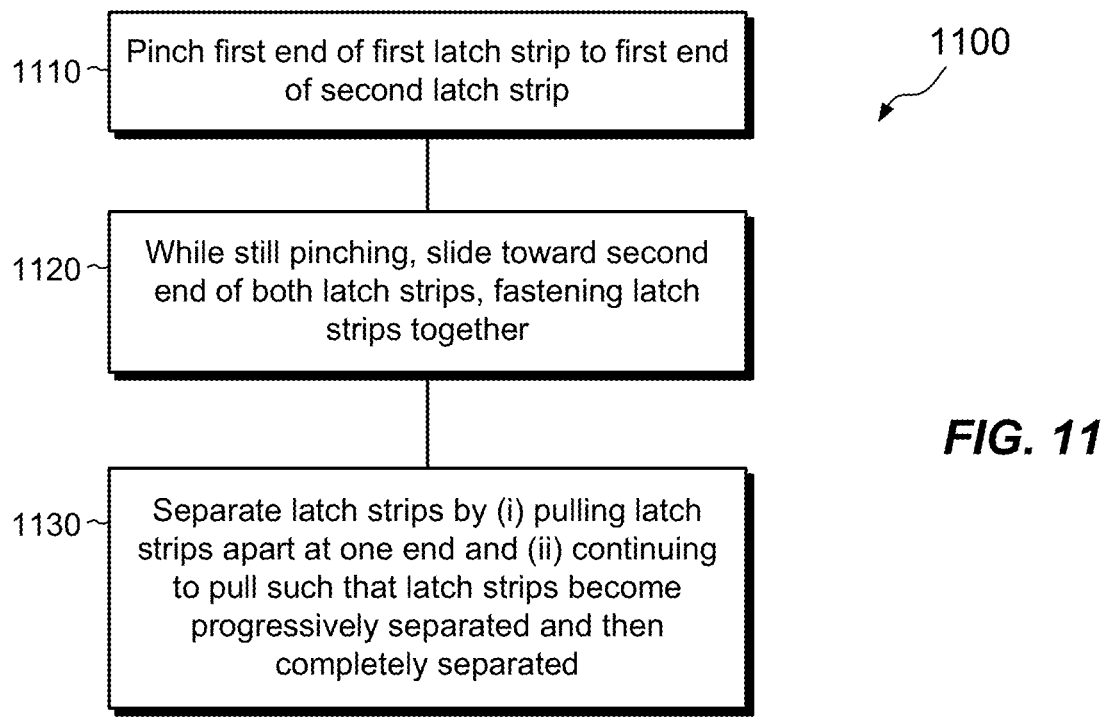
FIG. 11 is a flowchart showing an example method of engaging and disengaging first and second latch strips according to the second embodiment.

FIG. 11 shows an example method 1100 of joining and separating latch strips 310 according to the second embodiment. At 1110, two ends 312*a* and 312*b* of respective latch strips 310*a* and 310*b* are pinched together, e.g., using a pair of members 320, forming an initial point of attachment (FIGS. 3*a* and 3*b*). At 1120, while continuing to pinch, the members 320 are slid toward opposite ends 314*a* and 314*b* of the respective latch strips 310*a* and 310*b*, fastening the two latch strips together (FIGS. 3*c* and 3*d*). At 1130, which typically occurs at a later time, the two latch strips 310*a* and 310*b* can be separated by pulling them apart at one end (FIGS. 4*a* and 4*b*) and continuing to pull such that the latch strips 310*a* and 310*b* become progressively separated (FIG. 4*c*) and then completely separated (FIG. 4*d*).

Figure 12:
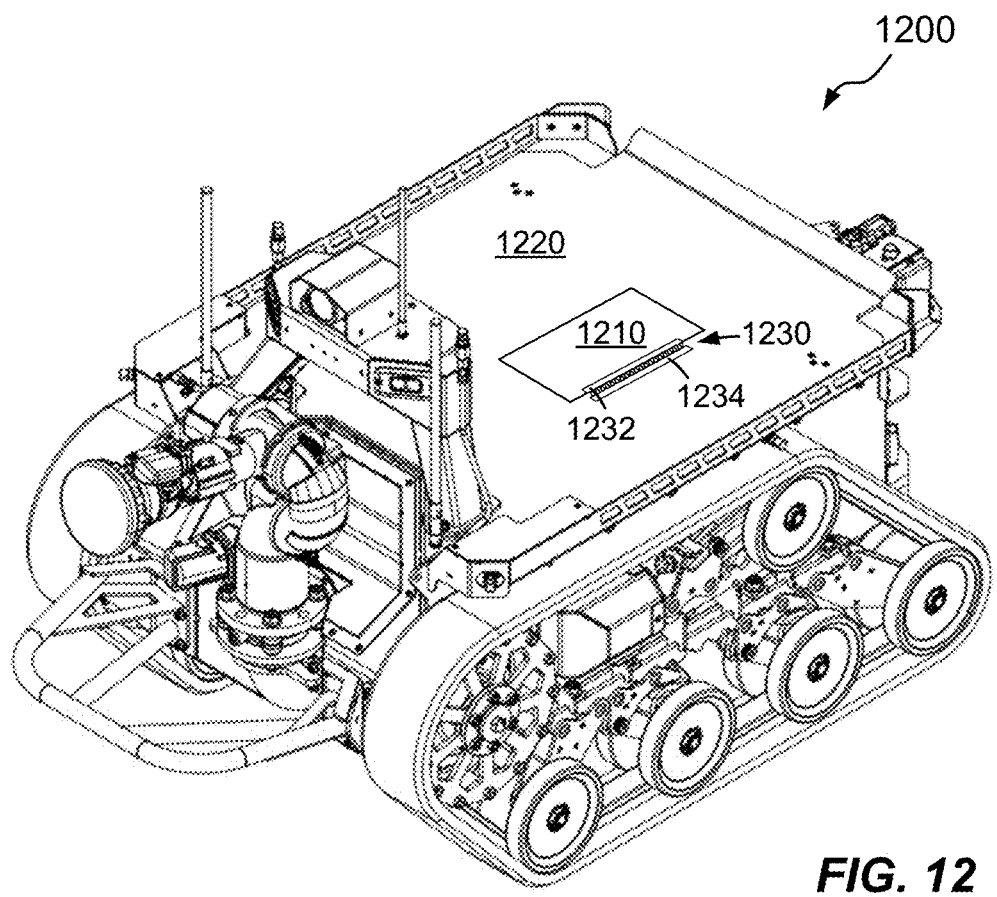
FIG. 12 is a perspective view of an example vehicle that uses a fastener in accordance with any of the disclosed embodiments.

FIG. 12 shows an example application of any of the above-described latch strips in a vehicle 1200. The vehicle 1200 may be a firefighting vehicle or any other type of vehicle. Here, one may wish to attach an accessory 1210 to a surface 1220 of the vehicle 1200. The accessory may be any tool, component, or assembly, for example. A fastener 1230 may be used to form a releasable attachment between the accessory 1210 and the vehicle surface 1220 using a first latch strip 1232 attached to the accessory 1210 and a second latch strip 1234 attached to the surface 1220. The latch strips 1232 and 1234 may be joined together and later separated in any of the ways described above.

An improved technique has been described for forming a releasable attachment. The technique provides first and second latch strips (110, 310, or 510) each having an alternating pattern of lobes (122 or 522) and troughs (124 or 524). The lobes of the first latch strip are adapted to fit within the troughs of the second latch strip, and vice versa, with the lobes retained within the troughs until sufficient force is applied between the first and second latch strips to separate them.

Additional Information:

The disclosed embodiments provide for the attachment of parts or assemblies without the use of tools or hardware, and/or in spaces with limited access. A series of lobes and troughs interconnect to form a mechanical attachment between latch strips, which can be separated by simply pulling the latch strips apart. The geometry of the lobes and troughs, as well as the rubber type and durometer, can be adjusted to alter the latching load and sealing effectiveness. Example uses of latch strips include:

Attachment of parts/assemblies onto other parts/assemblies where there is limited space, and/or tools do not fit in the work area.

Blind attachment of parts into a cavity, where access to the back of the cavity is now blocked due to the insertion of the part.

Flexible latch pieces may be used for attaching flexible parts, such as canvas or tarps without the use of tools, hardware, ropes, or straps. In such cases, the geometry of the lobes and troughs, as well as the material type and durometer, can be adjusted to alter the latching load and sealing effectiveness of the mating strips. The strips can only be separated by "unzipping" them from either end, resisting separation in any other load case. Example uses of flexible latch strips include:

Attachment of flexible parts such as a canvas or tarp.

Situations where a flexible cover would need to be easily removed but must withstand external forces such as wind that would put tension on the cover and connection.

Having described certain embodiments, numerous alternative embodiments or variations can be made. For example, features of any of the above-described embodiments may be used in any of the other described embodiments. Latch strips with rigid bases 130, like the ones shown in FIGS. 1*a*-1*c* may be mated with flexible fasteners like the ones shown in FIGS. 3*a*-3*d* and 4*a*-4*d*. Thus, the above-described embodiments are not required to be distinct but rather may be used together.

Also, embodiments of the disclosed fasteners have been described in connection with a vehicle, such as a firefighting vehicle. This is merely an example, though, as the disclosed embodiments may find a wide variety of applications and are not limited to any applications or fields of use.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

| Table of Reference Numerals | |
|---|---|
| Ref. Num. | Description |
| 100 | Fastener according to first embodiment |
| 110 | Latch strip according to first embodiment. Includes a main body composed of a material and having lobes and troughs, as well as a rigid base that resists lengthwise bending. |
| 110a, 110b | First and second latch strips according to first embodiment |
| 120 | Main body of latch strip, including lobes, troughs, and a bottom region |
| 122 | Lobe(s) |
| 124 | Trough(s), i.e., empty regions between adjacent lobes |
| 126 | Bottom region, between bottoms of troughs and bottom of main body |
| 130 | Rigid base |
| 140 | Length dimension |
| 202 | Head of lobe |
| 204 | Neck of lobe |
| 210 | Width of lobe at widest point (head) |
| 220 | Width of lobe at narrowest point (neck) |
| 230 | Width of trough at widest point (typically equal to or slightly larger than width of lobe at widest point) |
| 240 | Width of trough at narrowest point (typically equal to or slightly larger than width of lobe at narrowest point) |
| 250 | Height of lobe |
| 260 | Thickness of bottom region 126 |
| 270 | Thickness of rigid base 130 |
| 310 | Latch strip according to second embodiment (has no rigid base and is flexible over its length) |
| 310a, 310b | First, second latch strips according to second embodiment |
| 312a, 312b | First adjacent ends (proximal ends) of latch strips according to second embodiment |
| 314a, 314b | Second adjacent ends (distal ends) of latch strips according to second embodiment |
| 320 | Members, such as fingers or tools used to pinch together latch strips |
| 330 | Adapter, such as eyelet or grommet, for attaching latch strip 310 to item to be fastened |
| 502 | Head of latch strip according to third embodiment |
| 504 | Neck of latch strip according to third embodiment |
| 510 | Latch strip according to third embodiment (used with ladder piece) |
| 522 | Lobe(s) of latch strip 510 |
| 524 | Trough(s) of latch strip 510 |
| 526 | Bottom region of latch strip 510 |
| 600 | Latch-strip assembly |
| 600a, 600b | First and second latch-strip assemblies |
| 610 | Ladder piece |
| 620 | Spacer piece |
| 620a | Frame of spacer piece |
| 620b | Open region of spacer piece (at least partially contains bottom region 626 of latch strip 510) |
| 712 | Slots of ladder piece |
| 714 | Rungs of ladder piece |
| 1000 | Method of attaching and releasing latch strips 110 and/or 510 (first and third embodiments) |
| 1010, 1020, 1030, 1040 | Acts of method 1000 |
| 1100 | Method of attaching and releasing latch strips 310 (second embodiment) |
| 1110, 1120, and 1130 | Acts of method 1100 |
| 1200 | Vehicle |
| 1210 | Accessory, such as a tool, component, or assembly |
| 1220 | Surface of vehicle |
| 1230 | Fastener |
| 1230a, 1230b | First and second latch strips of fastener |

What is claimed is:

1. A fastener for forming a releasable attachment, comprising:
   a first latch strip composed at least in part of deformable material and having a first plurality of lobes and a first plurality of troughs; and
   a second latch strip having a second plurality of lobes and a second plurality of troughs; and
   a ladder piece having an alternating arrangement of slots and rungs, the lobes of the first plurality of lobes extending through the slots and the bottoms of the troughs of the first plurality of troughs abutting the rungs,
   wherein at least some of the first plurality of lobes are disposed within at least some of the second plurality of troughs and at least some of the second plurality of lobes are disposed within at least some of the first plurality of troughs,
   wherein each of the lobes of the first plurality of lobes and the second plurality of lobes has a head portion and a neck portion narrower than the head portion, wherein each of the troughs of the first plurality of troughs and the second plurality of troughs has a wider region arranged to receive a head portion and a narrower region arranged to receive a neck portion, and wherein the lobes have substantially flat tops and the troughs have substantially flat bottoms.

2. The fastener of claim 1, wherein the deformable material has a hardness in a range between 20 A and 90 A Durometer.

3. The fastener of claim 1, wherein the wider regions of the troughs are wider than the head portions of the lobes.

4. The fastener of claim 1, wherein the head portions of the lobes have a width in a range between 0.5 cm and 10 cm.

5. The fastener of claim 1, wherein at least one of the first latch strip and the second latch strip has a rigid base that resists deformation in a lengthwise dimension.

6. The fastener of claim 1, wherein at least one of the first latch strip and the second latch strip is flexible in a lengthwise dimension and deforms in response to manually applied forces.

7. The fastener of claim 6, wherein the first latch strip and the second latch strip are both flexible in the lengthwise dimension, and wherein the first latch strip and the second latch strip can be separated by bending, along the lengthwise dimension, an end of the first latch strip away from an adjacent end of the second latch strip.

8. The fastener of claim 7, wherein at least one of the first latch strip and the second latch strip includes an anchoring feature for affixing the respective latch strip(s) to one or more flexible materials.

9. The fastener of claim 1, further comprising a spacer piece having an outer frame disposed against the ladder piece and an inner opening into or through which a back of the first latch strip extends.

10. The fastener of claim 1, wherein the ladder piece is a first ladder piece, and wherein the fastener further comprise:
a first spacer piece having an outer frame disposed against the first ladder piece and an inner opening into or through which a back of the first latch strip extends;
a second ladder piece having an alternating arrangement of slots and rungs, the lobes of the second plurality of lobes extending through the slots of the second ladder piece, the bottoms of the troughs of the second plurality troughs abutting the rungs of the second ladder piece; and
a second spacer piece having an outer frame disposed against the second ladder piece and an inner opening into or through which a back of the second latch strip extends.

11. The fastener of claim 10, wherein the rungs of the first ladder piece are disposed between the back of the first latch strip and the second plurality of lobes, and wherein the rungs of the second ladder piece are disposed between the back of the second latch strip and the first plurality of lobes.

12. A vehicle, comprising a surface, an accessory, and a fastener that forms a releasable attachment between the surface and the accessory, the fastener including:
a first latch strip having a first plurality of lobes and a first plurality of troughs; and a second latch strip composed at least in part of deformable material having a second plurality of lobes and a second plurality of troughs; and a ladder piece fastened to the surface and having an alternating arrangement of slots and rungs, the lobes of the first plurality of lobes extending through the slots, and the bottoms of the troughs of the first plurality of troughs abutting the rungs, wherein at least some of the first plurality of lobes are disposed within at least some of the second plurality of troughs and at least some of the second plurality of lobes are disposed within at least some of the first plurality of troughs.

13. A method of handling a releasable attachment between a first surface and a second surface, comprising:
securing a first latch strip to the first surface, the first latch strip including a first plurality of lobes;
securing a second latch strip to the second surface, the second latch strip including a second plurality of lobes; and
attaching the first surface to the second surface by forming an interlocking engagement between at least some of the first plurality of lobes and at least some of the second plurality of lobes,
wherein securing the first latch strip to the first surface is performed by applying a ladder piece to the first latch strip, the ladder piece having an alternating arrangement of slots and rungs, the lobes of the first plurality of lobes extending through the slots, and the bottoms of the troughs of the first plurality of troughs abutting the rungs.

14. The method of claim 13, further comprising separating the first surface from the second surface by pulling apart the first latch strip and the second latch strip.

15. The method of claim 13, wherein attaching the first surface to the second surface includes:
pinching together, between first and second members, the first latch strip and the second latch strip at respective first ends thereof; and
while continuing to pinch together the first latch strip and the second latch strip, sliding the first and second members toward respective second ends of the first latch strip and the second latch strip to progressively form the interlocking engagement between the first plurality of lobes and the second plurality of lobes.

16. The method of claim 14, further comprising separating the first latch strip from the second latch strip at least in part by:
bending the second latch strip away from the first latch strip at adjacent ends thereof; and
pulling apart the second latch strip from the first latch strip such that the lobes of the first plurality of lobes become progressively separated from the lobes of the second plurality of lobes and are no longer interlocking.

* * * * *